LOGIC CIRCUIT

Filed June 25, 1957 2 Sheets-Sheet 1

INVENTORS W. B. CAGLE
W. ULRICH
BY Alan C. Rose
ATTORNEY

LOGIC CIRCUIT

Filed June 25, 1957 2 Sheets-Sheet 2

INVENTORS W. B. CAGLE
W. ULRICH

BY Alan C. Rose

ATTORNEY

United States Patent Office 2,873,389
Patented Feb. 10, 1959

2,873,389

LOGIC CIRCUIT

William B. Cagle, Madison, N. J., and Werner Ulrich, New York, N. Y., assignors to Bell Telephone Laboratories, Incorporated, New York, N. Y., a corporation of New York Application June 25, 1957, Serial No. 667,759

4 Claims. (Cl. 307—88.5)

This invention relates to electronic switching or "logic" circuits having a plurality of output leads, and more specifically to such circuits in which diodes are employed to perform the required "logic" function.

In the data processing art, it is customary to use the term "And circuit" to designate a circuit which produces an output signal if all of its input leads are energized. Similarly, the term "Or circuit" is employed to designate a buffer type circuit which produces an output signal when any of its input leads are energized.

A conventional And circuit includes a group of diodes having one set of like electrodes connected to a common output terminal, and a current source also connected to this output terminal. When all of the diodes are back-biased by the application of signals of appropriate polarity to the other electrodes of each of the diodes, the current source is switched to the output circuit. In the past, when a number of output circuits were to be driven by a single And circuit, the impedances of the output circuits were matched or adjusted so that sufficient drive for each output circuit would be provided. However, this need for impedance matching has been severe limitation on the freedom of design of the logic and memory circuits required in data processing systems in which many complex systems are to be built up from standard logic building blocks.

Accordingly, one object of the present invention is to properly drive each of several output circuits having significantly different input impedances from a single logic circuit.

The foregoing object is realized, in accordance with an embodiment of the present invention, by providing separate output diodes and separate current sources for each output of the And circuit. The composite And circuit then has individual output diodes located between the individual current sources and the common terminal of the input diodes. The individual current sources are then isolated or decoupled from one another by the back-to-back diodes in the path between any two current sources. Under these conditions, each output circuit is energized by the proper amount of current from its individual current source, and would be unaffected even by a short circuit presented by one of the other output circuits.

It is a feature of the invention that an And circuit includes a group of input diodes and a group of output diodes all poled in the same direction from inputs to outputs and all having one electrode connected to a comcon intermediate point, the other electrodes of the output diodes being connected to output circuits having different input impedances. In addition, individual different current sources may be connected to the output side of each of the output diodes.

In accordance with additional features of the invention, the current sources may includes a voltage source and respectively different resistances, and Or circuits may be interposed between the output diodes and the following output circuits having different input impedances.

A complete understanding of this invention and of these and other features thereof may be gained from a consideration of the following detailed description and the accompanying drawings, in which.

Figure 1:
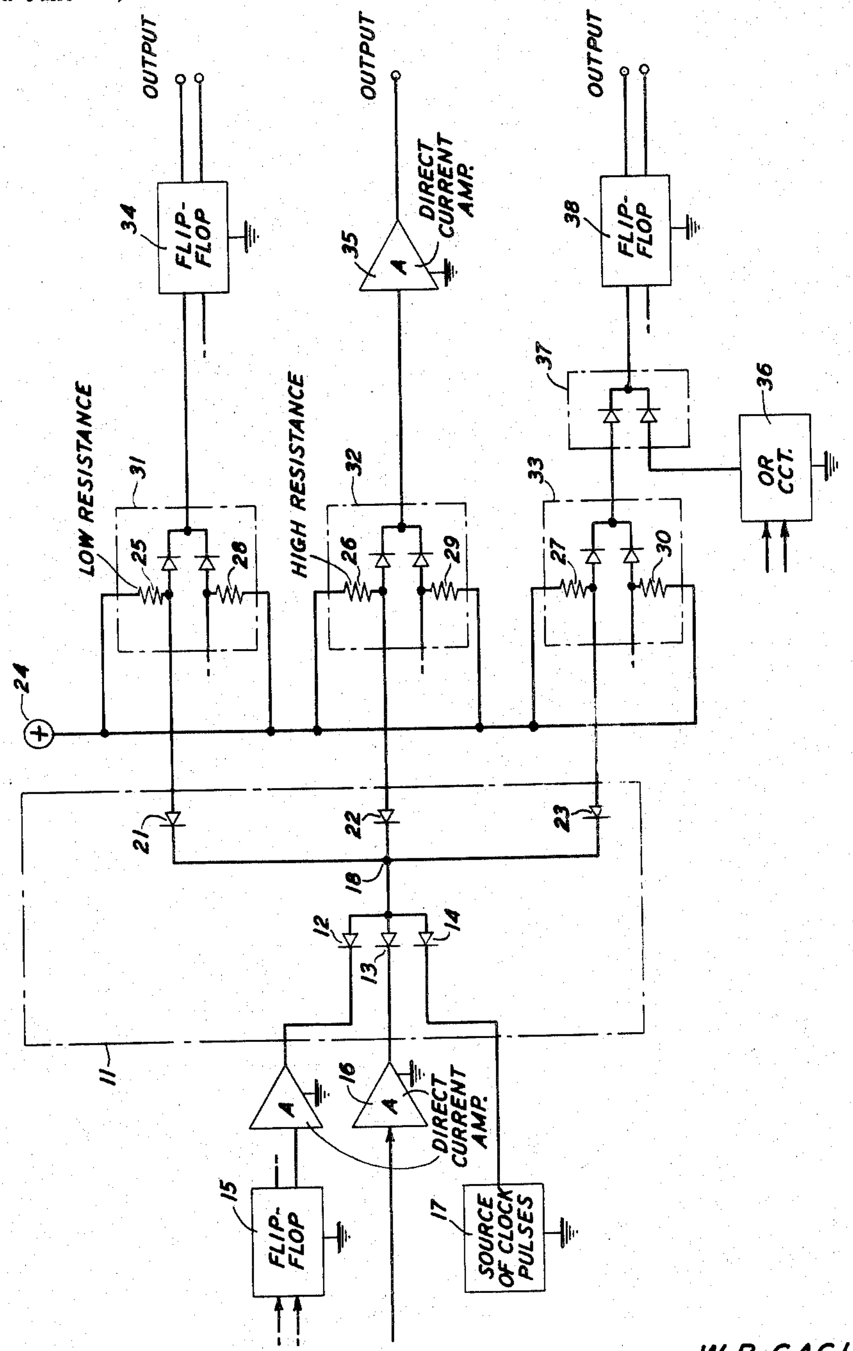
Fig. 1 is a circuit diagram of a circuit in accordance with one specific illustrative embodiment of our invention.

Referring more particularly to Fig. 1 of the drawing, the circuit 11 enclosed in dash-dot lines is an illustrative decoupling And circuit in accordance with the present invention. The decoupling And circuit of Fig. 1 includes the three input diodes 12, 13, and 14. The flip-flop 15, the direct current amplifier 16 and the source of clock pulses 17 are connected respectively to the three input diodes 12, 13, and 14. Each of the input diodes 12, 13, and 14 has one electrode connected to a common intermediate point 18.

Let us assume that in this specific embodiment it is desired to drive three output circuits from the And gate 11. The additional diodes 21, 22, and 23 are associated respectively with the three output circuits. Each of the three output diodes 21, 22, and 23 also has one electrode connected to the common intermediate point 18, and all three diodes are poled in the same direction as the input diodes 12 through 14. In accordance with one aspect of our invention, the source of biasing current for the And gate 11 is divided into individual current sources connected to the output circuits associated with each of the output diodes 21, 22, and 23. More specifically, the biasing circuitry includes the source of voltage indicated by terminal 24, and the resistors 25, 26, and 27 which are shown as part of the Or circuits 31, 32, and 33 which are connected to the diodes 21, 22, and 23, respectively. The voltage source 24 is connected to one terminal of each of the resistors 25, 26, and 27, and thereby provides a current source individual to each of the three output circuits.

The Or circuits 31, 32, and 33 each includes diodes poled oppositely with respect to the decoupling diodes 21, 22, and 23. A flip-flop circuit 34 is coupled to the output of the Or circuit 31. In a similar manner, the direct current switching amplifier 35 is coupled to the output of the Or circuit 32. Two additional Or gates 36 and 37 and a flip-flop 38 are associated with the Or circuit 33 at the third output circuit.

The And gate 11 is responsive to positive input pulses. In the absence of positive pulses applied to all three input diodes 12, 13, and 14, the current from the individual resistors 25, 26, and 27 flows through each of the output diodes 21, 22, and 23 and the input diodes which are not positively biased. However, when positive pulses are provided by the flip-flop 15, the amplifier 16, and the source of clock pulses 17, all of the input diodes 12 through 14 as well as the output diodes 21 through 23 are back-biased. When all of these diodes are back-biased, the current is switched toward the output circuits 34, 35, and 38.

The current requirements and the input impedances of the output circuits 34 and 35 are quite different. For example, the flip-flop 34 requires a considerable amount of drive, and it is desired to increase the voltage applied to it to a moderately high level. Considering the direct current amplifier 35, however, its current requirements are relatively low, and it is provided with a clamping circuit which prevents the input voltage from rising above a predetermined maximum voltage. To accommodate the greater current requirements of the flip-flop 34, the resistor 25 has a relatively low value which may, for example, be 2,610 ohms. In keeping with the lower current requirements of the direct current amplifier 35, the resistor 26 has a relatively high value which may, for example, by 7,500 ohms.

It was also noted above that the maximum input voltage to the direct current amplifier is limited to a predetermined low voltage. As will be set forth in detail below, this voltage may actually be about 7 volts. In contrast to this relatively low maximum driving voltage, it is desirable to apply a voltage of at least 10 volts to the flip-flop 34 to change its state rapidly. In the absence of the diodes 21 and 22, this difference in applied voltage to circuits 34 and 35 would not be practical, and the flip-flop 34 would necessarily have an input voltage limited to the maximum voltage at the input to the amplifier 35. With the back-to-back diodes 21 and 22 being included in the path between resistors 25 and 26, however, no current from resistor 25 can flow to the switching amplifier 35. Accordingly, a much higher voltage may be built up at the input to the flip-flop 34 than is permissible at the input to the gate amplifier 35. As mentioned above, the flip-flop 34 and the amplifier 35 have different input impedances. Furthermore, these impedances change at different levels of input voltage. For completeness, in the following paragraphs an exemplary amplifier and flip-flop will be described briefly, and the different input drive requirements will be particularly noted.

Figure 2:
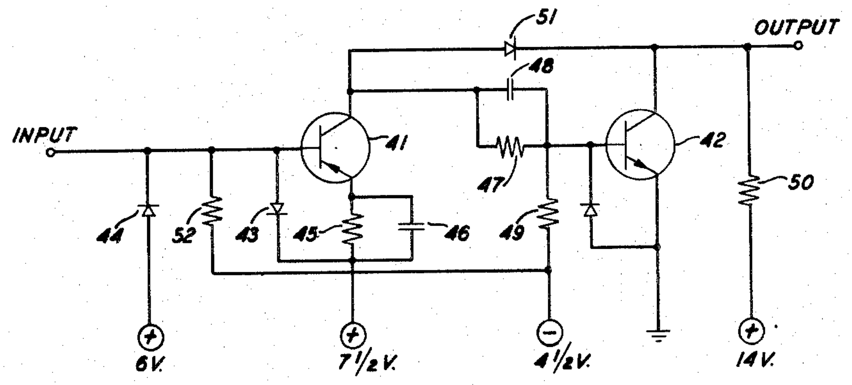
Fig. 2 is a detailed circuit diagram of one of the output circuits shown in Fig. 1.

Fig. 2 is a circuit diagram of one exemplary embodiment of the amplifier 35, which is shown as a block in the circuit of Fig. 1, and which may be driven by a circuit in accordance with the invention. The amplifier of Fig. 2 includes a P–N–P transistor 41 and an N–P–N transistor 42. It was considered desirable to use a pair of transistors having opposite polarity types in order to satisfy the requirements of the system in which the circuit is to be used. These requirements include (1) direct current coupling, (2) no voltage shifting from stage to stage, (3) both current and voltage gain is required, and (4) no inversion from input to output is permitted. An amplification circuit employing transistors of opposite polarity types appeared to be the most practical type of circuit to meet these requirements.

Turning now to the circuit details, it may be noted that the transistors 41 and 42 will normally assume the same conductivity state. When the input to the base of the transistor 41 is less than 6 volts, the transistors 41 and 42 are in the energized state. However, when the input And circuit shown at 11 in Fig. 1 is energized and the input potential to the amplifier rises, the transistors 41 and 42 are de-energized. The diode 43 is connected from the base of transistor 41 to a voltage source having a value of plus 7 and ½ volts. This is a clamping diode, and prevents the application of a voltage greater than 7 and ½ volts to the base of transistor 41. As will be discussed later, it is desirable to drive the flip-flop with a somewhat greater voltage. Accordingly, during the time interval when the input voltage to the amplifier of Fig. 2 is clamped at plus 7 and ½ volts and the flip-flop 34 is being driven at a higher positive voltage level, the back-to-back diodes 21 and 22 serve to isolate the two output circuits and to permit the different driving voltages at the inputs to the two circuits.

To continue with the description of Fig. 2, a number of circuit elements are provided to prevent the saturation of the transistors 41 and 42. These circuit elements include the diode 44 and the resistor 45, for example, which are associated with transistor 41. The diode 44 is coupled from the base of transistor 41 to a voltage source having a level of plus 6 volts. Accordingly, the maximum possible voltage swing at the input of transistor 41 is 1 and ½ volts from plus 6 volts to plus 7 and ½ volts. It may be noted that the emitter of the transistor 41 is connected to the same 7 and ½ volt source to which the diode 43 is connected. Accordingly, when the input voltage to the base of transistor 41 is at the six volt level, the base-to-emitter circuit of transistor 41 is biased in the low resistance direction and the transistor is energized. However, the transistor 41 can never become saturated, because the limited voltage which appears across the base-to-emitter circuit in combination with the resistor 45 in this circuit fixes the emitter current for the energized state of the transistor. In addition, the load for the transistor is such that the flow of collector current, which is equal to the current amplification factor times the emitter current, does not change the normal reverse bias at the collector junction to the forward bias which is characteristic of saturation conditions. The condenser 46 is connected in parallel with the resistor 45, and is provided to speed up the flow of emitter current upon the initial energization of transistor 41.

The collector of transistor 41 is connected to the base of transistor 42 by the resistor 47 and the shunt capacitor 48. The capacitor 48 is a speed-up capacitor which helps initial current flow in the transistor 42 as it is being turned on. The resistor 49 is connected to a voltage source having a value of minus 4 and ½ volts. This voltage source normally maintains transistor 42 in the de-energized state. When the transistor 41 is energized, the base of transistor 42 is raised toward the 7 and ½ volt supply coupled to the emitter of transistor 41 until the base is positive with respect to the emitter of transistor 42. Transistor 42 is then energized. The diode 51 plays a part in the energization of transistor 42 and in maintaining it unsaturated. Thus, as transistor 41 turns on, diode 51 is back-biased, and no current flows through it. The collector current is therefore all applied to raise the potential of the base of transistor 42 and to energize it. When transistor 42 turns on, however, diode 51 assumes the low resistance state and provides a path for approximately half of the collector current, as required to keep transistor 42 out of saturation. The resistor 52 is coupled from the base of transistor 41 to the voltage supply having a value of minus 4 and ½ volts. This provides energizing current for transistor 41 when the And gate 11 of Fig. 1 is in the de-energized state, and has less than all of its inputs energized.

For completeness and to indicate one operative circuit arrangement, the following circuit values may be employed. The voltage applied to terminal 24 in Fig. 1 may be 22 volts. The resistances 26 and 29 in Fig. 1 may be equal to 7,500 ohms. In Fig. 2, the transistors may be junction type transistors of opposite conductivity types. The diodes may be junction diodes. The values of the other components in Fig. 2 may be as follows:

| | | |
|---|---|---|
| Resistor 52 | ohms | 10,000 |
| Resistor 45 | do | 196 |
| Resistor 47 | do | 287 |
| Resistor 49 | do | 1,470 |
| Resistor 50 | do | 1,800 |
| Capacitor 46 | micromicrofarads | 1,500 |
| Capacitor 48 | do | 1,500 |

Figure 3:
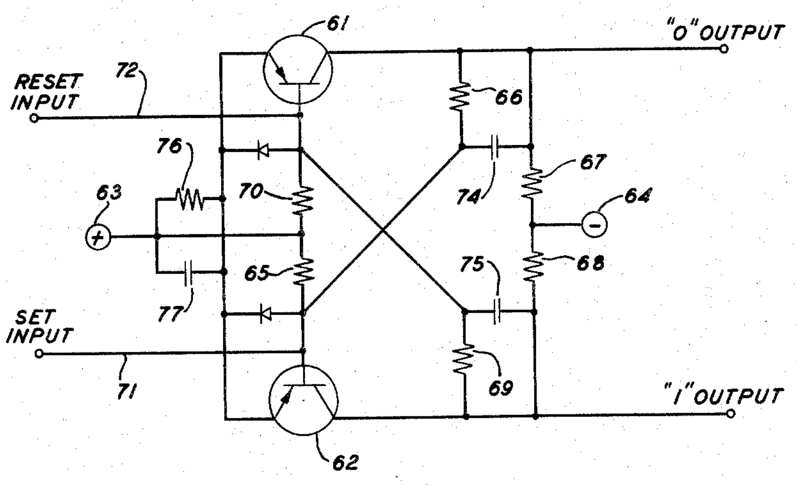
Fig. 3 is a detailed circuit diagram of another of the output circuits shown in Fig. 1.

One specific exemplary embodiment of a flip-flop 34 that may be driven by a circuit in accordance with our invention is shown in detail in Fig. 3. It includes the two transistors 61 and 62 arranged to form a classic Eccles-Jordan flip-flop. The flip-flop circuit includes a source of positive potential connected to terminal 63 and a source of negative potential connected to terminal 64. Excluding the circuits in which the transistors are located for the moment, there are two sets of series connected resistors connected in parallel between the positive and negative terminals 63 and 64, respectively. One set of three series connected resistors includes resistors 65, 66, and 67. The resistors 68, 69, and 70 constitute the other set of three series connected resistors.

If both transistors 61 and 62 were removed from the circuit, the current through the resistance networks would be equal, and the corresponding points between the resistors in each network would have the same potential. In addition, the values of resistance are such that either of the transistors would conduct if it alone were inserted back in the circuit. Now, considering the circuit with both of the transistors 61 and 62 in place, it will be assumed initially that transistor 62 is conducting. Under these conditions, resistor 69 carries somewhat less current than in the balanced arrangement hypothecated above. Under these circumstances, the potential at the base of transistor 61 becomes more positive and transistor 61 is de-energized. When transistor 62 is de-energized by a pulse on lead 71, however, the current through resistor 69 reduces the potential at the base of transistor 61 to a more negative level, and transistor 61 becomes energized. The state of the flip-flop may then be changed by a pulse applied to lead 72, which resets the flip-flop to the state in which transistor 62 is conducting.

The capacitors 74 and 75 serve to increase the speed of changing the state of the flip-flop. Thus, when a pulse has been applied to lead 71 to de-energize transistor 62, the potential at the collector of transistor 62 drops. The resultant negative wave form is promptly applied to the base of transistor 61 by condenser 75 to speed up the energization of transistor 61. Similarly, capacitor 74 increases the speed of energization of transistor 62 when transistor 61 is being turned off.

The resistor 76 is a dropping resistor which provides a reference voltage level for the emitters of transistors 61 and 62. The current through resistor 76 is very nearly constant, with either transistor 61 or 62 being conducting, and the shunting capacitor 77 being provided for stabilization during transition between the two states of the flip-flop.

By way of example, the values of the resistors and capacitors employed in the circuit of Fig. 3 may be as follows:

| | |
|---|---|
| Resistance 65 ohms | 3,160 |
| Resistance 66 do | 3,830 |
| Resistance 67 do | 3,830 |
| Resistance 68 do | 3,830 |
| Resistance 69 do | 3,830 |
| Resistance 70 do | 3,160 |
| Resistance 76 do | 1,000 |
| Capacitors 74 micromicrofarads | 50 |
| Capacitors 75 do | 50 |
| Capacitors 77 do | 500 |

Suitable junction transistors and diodes may also be employed, and voltages of plus 14 and minus 18 volts may be applied to terminals 63 and 64, respectively. The resistors 28 and 30 included in the Or circuits 31 and 33, respectively, have the same 2,610 ohm value of resistance as the resistors 25 and 27. This is, of course, a significantly lower value of resistance than the 7,500 ohms of resistors 26 and 29 in the Or circuit 23 at the input of the direct current amplifier 35.

As mentioned above, it is desirable to drive the input leads 71 and 72 with powerful signals as compared with the relatively small voltage swings which are desired at the input of the gate amplifier. Specifically, it is important to be able to drive the flip-flop by signals which are significantly greater than the 7 and ½ volt limit at the input of transistor 41 of the gate amplifier. It is again noted that the necessary isolation between the two stages is accomplished by the back-to-back diodes such as 21 and 22 of Fig. 1, which isolate the individual current sources associated with each output.

The circuit of Fig. 1 has a collateral advantage which has not been stressed in the preceding description. Through the use of individual current sources associated with each of the output Or gates 31, 32, and 33, the amount of power which is available is automatically tailored to suit the number of output circuits which are driven by the And gate. This feature is particularly useful in large systems where flexibility in the use of packaged logic circuits is important.

It is to be understood that the above-described arrangements are illustrative of the application of the principles of the invention. Numerous other arrangements may be devised by those skilled in the art without departing from the spirit and scope of the invention.

What is claimed is:

1. In an electronic switching circuit, a plurality of diode Or circuits, a diode And circuit connected to said plurality of Or circuits, a plurality of load circuits having different input impedances connected to the outputs of said Or circuits, a plurality of means for supplying different amounts of current to the leads interconnecting said And circuit and each of said Or circuits, and a decoupling diode poled in opposition to the diodes in said Or circuits connected in series with each of said leads between the And circuit and each of said current supplying means, the only electrical components directly connected to each of said current supplying means being one of said decoupling diodes and one of the diodes in each of said Or circuits.

2. In combination, a plurality of diode Or circuits, a diode And circuit, means applying signals from said And circuit directly to said plurality of Or circuits, a plurality of load circuits having different input impedances connected to the outputs of said Or circuits, a plurality of means for supplying different amounts of current to the leads interconnecting said And circuit and each of said Or circuits, and a decoupling diode poled in opposition to the diodes in said Or circuits connected in series with each of said leads between the And circuit and each of said current supplying means.

3. In combination, a group of input diodes and a group of output diodes all poled in the same direction from input to output and each of the diodes in each group having one electrode connected to a common intermediate point, a plurality of input driving circuits connected respectively to the other electrodes of said input diodes, a plurality of different current sources connected respectively to supply different amounts of current to the other electrodes of said output diodes, a plurality of loads having different input impedances, and a plurality of diodes poled in opposition to said groups of diodes and each being connected between one of said other electrodes of said output diodes and one of said loads.

4. In combination, a group of input diodes and a group of output diodes all poled in the same direction from input to output and each of the diodes in each group having one electrode connected to a common intermediate point, a plurality of input driving circuits connected respectively to the other electrodes of said input diodes, a plurality of different current sources connected respectively to supply different amounts of current to the other electrodes of said output diodes, a plurality of loads having different input impedances, and a plurality of diode Or gates each having one diode poled in opposition to said groups of diodes and connected between one of said other electrodes of said output diodes and one of said loads.

References Cited in the file of this patent

UNITED STATES PATENTS

| | | |
|---|---|---|
| 2,644,887 | Wolfe | July 7, 1953 |
| 2,798,667 | Spielberg et al. | July 9, 1957 |
| 2,799,450 | Johnson | July 16, 1957 |